US012795512B2

(12) United States Patent
Nader et al.

(10) Patent No.: US 12,795,512 B2
(45) Date of Patent: Nov. 10, 2026

(54) SYNCHRONIZATION SIGNAL BLOCK (SSB) PROVISION ADAPTATION FOR WIRELESS DEVICES

(71) Applicant: Telefonaktiebolaget LM Ericsson (publ), Stockholm (SE)

(72) Inventors: Ali Nader, Malmö (SE); Sina Maleki, Malmö (SE); Andres Reial, Höllviken (SE); Ilmiawan Shubhi, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 324 days.

(21) Appl. No.: 18/683,987

(22) PCT Filed: Aug. 29, 2022

(86) PCT No.: PCT/SE2022/050774

§ 371 (c)(1),
(2) Date: Feb. 15, 2024

(87) PCT Pub. No.: WO2023/033700

PCT Pub. Date: Mar. 9, 2023

(65) Prior Publication Data

US 2024/0357475 A1 Oct. 24, 2024

Related U.S. Application Data

(60) Provisional application No. 63/238,353, filed on Aug. 30, 2021.

(51) Int. Cl.
*H04W 48/08* (2009.01)
*H04L 43/103* (2022.01)

(52) U.S. Cl.
CPC .......... *H04W 48/08* (2013.01); *H04L 43/103* (2013.01)

(58) Field of Classification Search
CPC ............ H04W 48/08; H04W 52/0219; H04W 52/0229; H04W 52/028; H04W 52/0216;
(Continued)

(56) References Cited

U.S. PATENT DOCUMENTS

2018/0220360 A1* 8/2018 Sheng ................ H04L 27/2692
2023/0189333 A1* 6/2023 Liu ...................... H04W 74/06
370/329

FOREIGN PATENT DOCUMENTS

CN 110430583 A 11/2019
CN 112654079 A 4/2021

OTHER PUBLICATIONS

International Search Report and Written Opinion dated Dec. 5, 2022 for International Application No. PCT/ SE2022/050774 filed Aug. 29, 2022; consisting of 11 pages.

* cited by examiner

*Primary Examiner* — Chuong A Ngo
(74) *Attorney, Agent, or Firm* — Weisberg I.P. Law, P.A.

(57) ABSTRACT

A method, system and apparatus are disclosed. A method implemented in a wireless device in a cell includes receiving at least one first synchronization signal block, SSB, from a first network node according to a first SSB provision scheme, determining that the first network node has transitioned from the first SSB provision scheme to a second SSB provision scheme, where the transition is based on signaling associated with at least one wireless device in the cell, and where the second SSB provision scheme is different from the first SSB provision scheme, and receiving at least one second SSB based on the second SSB provision scheme.

13 Claims, 11 Drawing Sheets

(58) Field of Classification Search
CPC ..... H04L 43/103; H04L 5/005; H04L 5/0053; Y02D 30/70
See application file for complete search history.

SYNCHRONIZATION SIGNAL BLOCK (SSB) PROVISION ADAPTATION FOR WIRELESS DEVICES

CROSS-REFERENCE TO RELATED APPLICATIONS

This application is a Submission Under 35 U.S.C. § 371 for U.S. National Stage Patent Application of International Application No.: PCT/SE2022/050774, filed Aug. 29, 2022 entitled "SYNCHRONIZATION SIGNAL BLOCK (SSB) PROVISION ADAPTATION FOR WIRELESS DEVICES," which claims priority to U.S. Provisional Application No. 63/238,353, filed Aug. 30, 2021, entitled "SYNCHRONIZATION SIGNAL BLOCK (SSB) PROVISION ADAPATION," the entireties of both of which are incorporated herein by reference.

FIELD

The present disclosure relates to wireless communications, and in particular, to adapting synchronization signal block, SSB, transmission such as by transitioning to a SSB provision scheme.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Network (NW) Energy Consumption

NW energy consumption in NR increases with respect to LTE due to more complex hardware (HW), e.g., higher bandwidth (BW) and a greater number of antennas. This is particularly more evident when the NW operates in higher frequencies. Hence it may be important for the NW to turn ON/OFF unused HW modules during inactivity times. For example, in frequency range 2 (FR2), an NR network node can be configured with up to 64 beams and transmit up to 64 SSBs. This implies 64 ports with many transceiver chains involved. Such SSBs are transmitted every 20 ms in during 5 ms windows to provide coverage to potential wireless device even if there actually are no wireless devices present in the cell.

SSB Configuration

An NR network node (e.g., gNB) can be configured with up to 64 SSBs. The configured SSBs in a cell for wireless devices in radio resource control (RRC) IDLE/INACTIVE have all the same periodicity and output power. The NR network node can provide information to the wireless device about how many/which SSBs that are active (present) within the serving cell and neighboring cells. The NR network node can further provide information about the rate/periodicity at which these SSBs are provided on the cell level. For the serving cell, the parameter ssb-PositionsInBurst indicates which of the SSBs that are active, and the parameter ssb-Periodicity ServingCell specifies the rate/periodicity. Furthermore, the wireless devices are informed about the SSBs output power via the common parameter ss-Physical Broadcast Channel (PBCH)-BlockPower. For neighbor cells, a NR network node can specify the neighboring active (present) SSBs via the parameter ssb-ToMeasure and the associated rate/periodicity via the SSB Measurement Timing Configuration (SMTC) which defines the time window during which the wireless device measures the SSBs belonging to these neighboring cells.

Wireless devices are configured with the above SSB presence and timing/rate information either in RRC_IDLE/INACTIVE state via broadcast system information or in RRC_Connected state via dedicated RRC messages. In IDLE/INACTIVE, the ssb-PositionsInBurst and ssb-PeriodicityServing for serving cell is configured via SIB1 and the SMTC configurations for neighboring cells are provided in SIB2/SIB4.

However, the increasing number of SSB transmissions in NR, particularly at higher frequencies, can increase the NW power consumption and contribute to excessive noise/interference for neighboring cells. The wireless device typically expects at least one set of SSBs to be transmitted every 20 ms, nevertheless, SSBs can also be configured with up to 160 ms periodicity. In order to improve the coverage, particularly in FR2, the NW may transmit SSBs in different beams to cover the cell area. Nevertheless, this may not always be necessary, e.g., if most or all the current wireless devices are rather close to the NR network node, or that a specific area in cell is empty and thus an SSB which is transmitted in a specific beam is not used by any wireless device.

Hence, in various scenarios, existing systems may transmit unnecessary SSB transmissions, which may disadvantageously cause interference and increase power consumption.

Therefore, there is a need to develop methods and mechanisms such that the number of unnecessary individual SSB transmissions are reduced.

SUMMARY

Some embodiments advantageously provide methods, systems, and apparatuses for adapting SSB transmission such as by transitioning to a SSB provision scheme.

One or more embodiments described herein provide methods and mechanisms with which the network node adapts the SSBs transmission based at least on wireless device needs.

The network node can, for example, during energy saving periods, either transmit fewer SSBs and/or with lower output power, and/or at a lower rate for to provide energy saving (compared to other periods without an energy savings configuration) and lower noise/interference to neighboring cells. When the network node is operating in such energy saving mode (i.e., operating in a first SSB provisioning scheme), it may poll for the presence of wireless devices that can utilize higher-rate or higher-power SSB provision, or potential wireless devices are informed about possibility to request SSBs when necessary. Upon detecting wireless device presence from polling responses or receiving requests from wireless devices, the network node may then change its SSBs provision scheme (e.g., one of number of SSBs/rate/power). Hence, SSB configurations are adapted or changed based at least on potential wireless devices in a cell and the wireless devices' needs/requirements rather than being preconfigured to always provide SSBs at high number/rate/ power (e.g., the second SSB provisioning scheme or SSB provisioning scheme that requires more energy than the first SSB provisioning scheme).

According to one aspect of the present disclosure, a network node is provided. The network node includes processing circuitry configured to cause transition from a first synchronization signal block, SSB, provision scheme to a second SSB provision scheme in a cell based at least on signaling associated with the at least one wireless device in the cell, where the second SSB provision scheme is different from the first SSB provision scheme, and to cause transmission of at least one SSB based at least on the second SSB provision scheme.

According to one or more embodiments of this aspect, the first SSB provision scheme is associated with either a lower energy consumption in the first network node compared to the second SSB provision scheme, or a higher energy consumption in the first network node compared to the second SSB provision scheme. According to one or more embodiments of this aspect, the signaling associated with the at least one wireless device in the cell includes at least one of at least one polling response, location information, a measurement result, and a first request for a SSB provision scheme transition. According to one or more embodiments of this aspect, the measurement result is based on at least one of at least one SSB transmitted by the first network node, and at least one SSB transmitted by at least one other network node. According to one or more embodiments of this aspect, the measurement result is based on at least one of at least one SSB of the first SSB provision scheme, at least one SSB of at least one other SSB provision scheme associated with a serving network node, and at least one SSB of at least one other SSB provision scheme associated with a neighboring network node. According to one or more embodiments of this aspect, the first request for the SSB provision scheme transition is associated with a measurement value of at least one SSB of the first SSB provision scheme falling below a threshold value.

According to one or more embodiments of this aspect, the threshold value is one of configured by the first network node, and set by the at least one wireless device in the cell. According to one or more embodiments of this aspect, the processing circuitry is further configured to start a prohibit timer at a first time upon receiving the first request for the SSB provision scheme transition, where the prohibit timer is configured to prohibit additional transition requests while the prohibit timer is running, and transition from the second SSB provision scheme to another SSB provision scheme based on a second request for a SSB provision scheme transition being received at a second time, where the prohibit timer is expired at the second time. According to one or more embodiments of this aspect, at least one of the at least one polling response is associated with a number of wireless devices in the cell being in at least one of an inactive state and an idle state. According to one or more embodiments of this aspect, at least one of the at least one polling response is associated with a group of wireless devices in the cell. According to one or more embodiments of this aspect, the first request for the SSB provision scheme transition is received from one of the at least one wireless device in the cell, and at least one neighboring network node. According to one or more embodiments of this aspect, the processing circuitry is further configured to cause transmission of a second request to a neighboring network node for the neighboring network node to transition from a third SSB provision scheme to a fourth SSB provision scheme based on the first network node being already configured with a maximum SSB power when receiving the first request from the at least one wireless device in the cell for the SSB provision scheme transition. According to one or more embodiments of this aspect, the second SSB provision scheme differs from the first SSB provision scheme based on at least one of a different number of transmitted SSBs, a different rate at which at least one SSB is transmitted, a different periodicity at which at least one SSB is transmitted, a different output power of at least one transmitted SSB, a different time domain position of at least one transmitted SSB, a different beam gain, a different coverage area of the cell, and a different number of antenna ports.

According to one aspect of the present disclosure, a method implemented in a network node is provided. The method includes causing transition from a first synchronization signal block, SSB, provision scheme to a second SSB provision scheme in a cell based at least on signaling associated with the at least one wireless device in the cell, where the second SSB provision scheme is different from the first SSB provision scheme, and causing transmission of at least one SSB based at least on the second SSB provision scheme.

According to one or more embodiments of this aspect, the first SSB provision scheme is associated with either a lower energy consumption in the first network node compared to the second SSB provision scheme, or a higher energy consumption in the first network node compared to the second SSB provision scheme. According to one or more embodiments of this aspect, the signaling associated with the at least one wireless device in the cell includes at least one of at least one polling response, location information, a measurement result, and a first request for a SSB provision scheme transition. According to one or more embodiments of this aspect, the measurement result is based on at least one of at least one SSB transmitted by the first network node, and at least one SSB transmitted by at least one other network node. According to one or more embodiments of this aspect, the measurement result is based on at least one of at least one SSB of the first SSB provision scheme, at least one SSB of at least one other SSB provision scheme associated with a serving network node, and at least one SSB of at least one other SSB provision scheme associated with a neighboring network node.

According to one or more embodiments of this aspect, the first request for the SSB provision scheme transition is associated with a measurement value of at least one SSB of the first SSB provision scheme falling below a threshold value. According to one or more embodiments of this aspect, the threshold value is one of configured by the first network node, and set by the at least one wireless device in the cell. According to one or more embodiments of this aspect, the method further includes starting a prohibit timer at a first time upon receiving the first request for the SSB provision scheme transition, where the prohibit timer is configured to prohibit additional transition requests while the prohibit timer is running, and transitioning from the second SSB provision scheme to another SSB provision scheme based on a second request for a SSB provision scheme transition being received at a second time, where the prohibit timer is expired at the second time. According to one or more embodiments of this aspect, at least one of the at least one polling response is associated with a number of wireless devices in the cell being in at least one of an inactive state and an idle state. According to one or more embodiments of this aspect, at least one of the at least one polling response is associated with a group of wireless devices in the cell.

According to one or more embodiments of this aspect, the first request for the SSB provision scheme transition is received from one of the at least one wireless device in the cell, and at least one neighboring network node. According to one or more embodiments of this aspect, the method further includes causing transmission of a second request to a neighboring network node for the neighboring network node to transition from a third SSB provision scheme to a fourth SSB provision scheme based on the first network node being already configured with a maximum SSB power when receiving the first request from the at least one wireless device in the cell for the SSB provision scheme transition. According to one or more embodiments of this aspect, the second SSB provision scheme differs from the first SSB provision scheme based on at least one of a different number of transmitted SSBs, a different rate at which at least one SSB is transmitted, a different periodicity at which at least one SSB is transmitted, a different output power of at least one transmitted SSB, a different time domain position of at least one transmitted SSB, a different beam gain, a different coverage area of the cell, and a different number of antenna ports.

According to one aspect of the present disclosure, a wireless device is provided. The wireless device includes processing circuitry configured to receive at least one first synchronization signal block, SSB, from the first network node according to a first SSB provision scheme, determine that the first network node has transitioned from the first SSB provision scheme to a second SSB provision scheme, where the transition is based on signaling associated with at least one wireless device in the cell, and the second SSB provision scheme is different from the first SSB provision scheme, and receive at least one second SSB based on the second SSB provision scheme.

According to one or more embodiments of this aspect, the first SSB provision scheme is associated with either a lower energy consumption in the first network node compared to the second SSB provision scheme, or a higher energy consumption in the first network node compared to the second SSB provision scheme. According to one or more embodiments of this aspect, the signaling associated with the at least one wireless device in the cell includes at least one of at least one polling response, location information associated, a measurement result, and a first request for a SSB provision scheme transition. According to one or more embodiments of this aspect, the measurement result is based on at least one of at least one SSB transmitted by the first network node, and at least one SSB transmitted by at least one other network node. According to one or more embodiments of this aspect, the measurement result is based on at least one of at least one SSB of the first SSB provision scheme, at least one SSB of at least one other SSB provision scheme associated with a serving network node, and at least one SSB of at least one other SSB provision scheme associated with a neighboring network node. According to one or more embodiments of this aspect, the first request for the SSB provision scheme transition is associated with a measurement value of at least one SSB of the first SSB provision scheme falling below a threshold value.

According to one or more embodiments of this aspect, the threshold value is one of configured by the first network node, and set by the at least one wireless device in the cell. According to one or more embodiments of this aspect, the processing circuitry is further configured to start a prohibit timer at a first time upon causing transmission of the first request for the SSB provision scheme transition, where the prohibit timer is configured to prohibit additional transition requests while the prohibit timer is running, and cause transmission at a second time of a second request for a SSB provision scheme transition based on the prohibit timer being expired at the second time. According to one or more embodiments of this aspect, the processing circuitry is further configured to receive a polling request from at least one of the first network node and a neighboring network node, and cause transmission of at least one of the at least one polling response based on the received polling request.

According to one or more embodiments of this aspect, the at least one of the at least one polling response is associated with the at least one wireless device in the cell being in at least one of an inactive state and an idle state. According to one or more embodiments of this aspect, the wireless device is associated with a group of wireless devices in the cell, and the polling request is associated with the group of wireless devices. According to one or more embodiments of this aspect, the second SSB provision scheme differs from the first SSB provision scheme based on at least one of a different number of transmitted SSBs, a different rate at which at least one SSB is transmitted, a different periodicity at which at least one SSB is transmitted, a different output power of at least one transmitted SSB, a different time domain position of at least one transmitted SSB, a different beam gain, a different coverage area of the cell, and a different number of antenna ports. According to one or more embodiments of this aspect, the processing circuitry is further configured to determine that the first network node is configured with the first SSB provision scheme based on at least one of implicit signaling, and explicit signaling.

According to one aspect of the present disclosure, a method implemented in a wireless device is provided. The method includes receiving at least one first synchronization signal block, SSB, from the first network node according to a first SSB provision scheme, determining that the first network node has transitioned from the first SSB provision scheme to a second SSB provision scheme, where the transition is based on signaling associated with at least one wireless device in the cell, and where the second SSB provision scheme is different from the first SSB provision scheme, and receiving at least one second SSB based on the second SSB provision scheme According to one or more embodiments of this aspect, the first SSB provision scheme is associated with either a lower energy consumption in the first network node compared to the second SSB provision scheme, or a higher energy consumption in the first network node compared to the second SSB provision scheme. According to one or more embodiments of this aspect, the signaling associated with the at least one wireless device in the cell includes at least one of at least one polling response, location information associated, a measurement result, and a first request for a SSB provision scheme transition. According to one or more embodiments of this aspect, the measurement result is based on at least one of at least one SSB transmitted by the first network node, and at least one SSB transmitted by at least one other network node. According to one or more embodiments of this aspect, the measurement result is based on at least one of at least one SSB of the first SSB provision scheme, at least one SSB of at least one other SSB provision scheme associated with a serving network node, and at least one SSB of at least one other SSB provision scheme associated with a neighboring network node. According to one or more embodiments of this aspect, the first request for the SSB provision scheme transition is associated with a measurement value of at least one SSB of the first SSB provision scheme falling below a threshold value.

According to one or more embodiments of this aspect, the threshold value is one of configured by the first network node, and set by the at least one wireless device in the cell. According to one or more embodiments of this aspect, the method further includes starting a prohibit timer at a first time upon causing transmission of the first request for the SSB provision scheme transition, where the prohibit timer is configured to prohibit additional transition requests while the prohibit timer is running, and causing transmission at a second time of a second request for a SSB provision scheme transition based on the prohibit timer being expired at the second time. According to one or more embodiments of this aspect, the method further includes receiving a polling request from at least one of the first network node and a neighboring network node, and causing transmission of at least one of the at least one polling response based on the received polling request.

According to one or more embodiments of this aspect, the at least one of the at least one polling response is associated with the at least one wireless device in the cell being in at least one of an inactive state and an idle state. According to one or more embodiments of this aspect, the wireless device is associated with a group of wireless devices in the cell, and the polling request is associated with the group of wireless devices. According to one or more embodiments of this aspect, the second SSB provision scheme differs from the first SSB provision scheme based on at least one of a different number of transmitted SSBs, a different rate at which at least one SSB is transmitted, a different periodicity at which at least one SSB is transmitted, a different output power of at least one transmitted SSB, a different time domain position of at least one transmitted SSB, a different beam gain, a different coverage area of the cell, and a different number of antenna ports. According to one or more embodiments of this aspect, the method further includes determining that the first network node is configured with the first SSB provision scheme based on at least one of implicit signaling, and explicit signaling.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
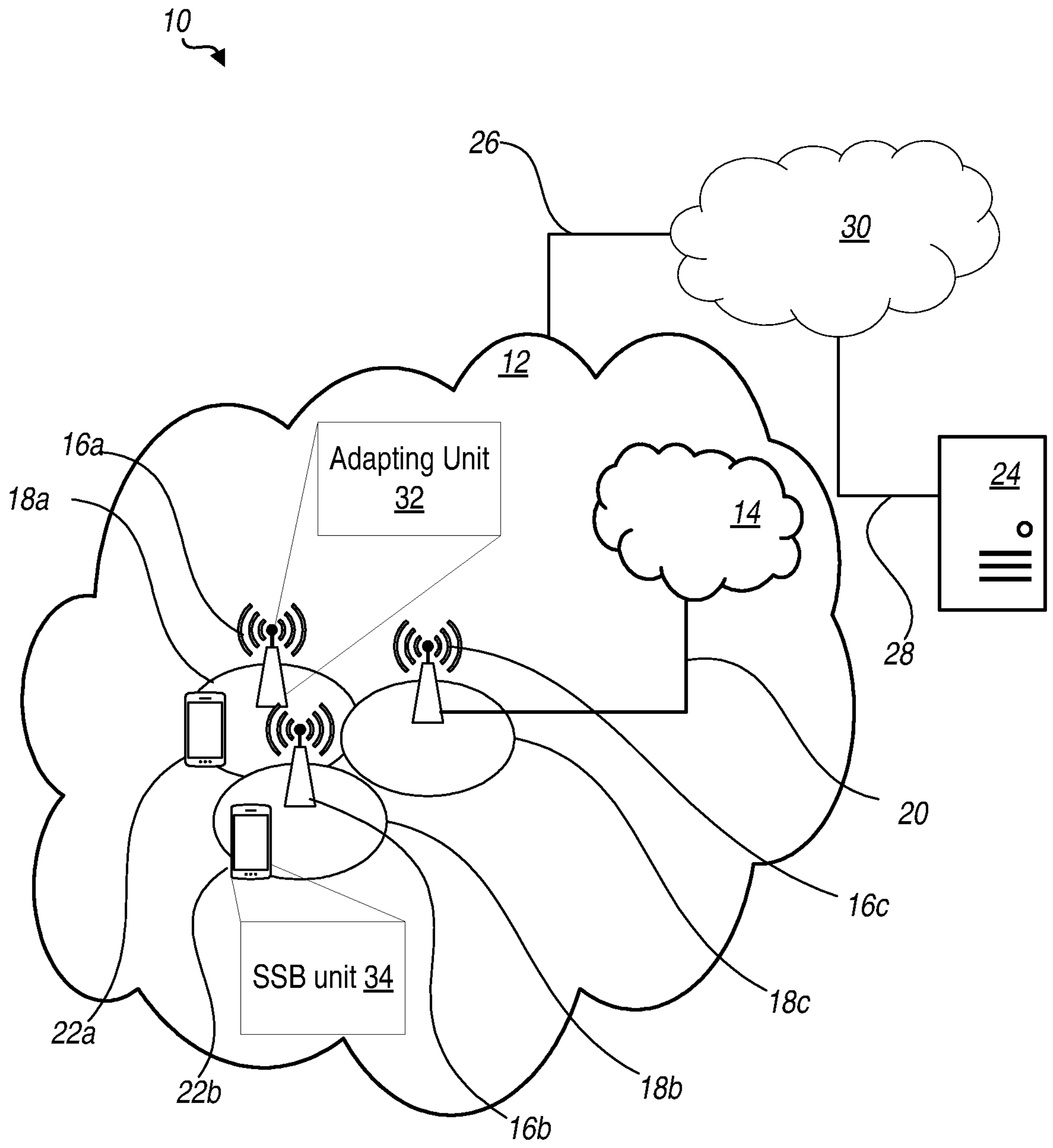
FIG. 1 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to adapting SSB transmission such as by transitioning to a SSB provision scheme. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

A cell may be generally a communication cell, e.g., of a cellular or mobile communication network, provided by a network node. A serving cell may be a cell on or via which a network node (the node providing or associated to the cell, e.g., base station, gNB or eNodeB) transmits and/or may transmit data (which may be data other than broadcast data) to a wireless device, in particular control and/or user or payload data, and/or via or on which a wireless device transmits and/or may transmit data to the network node; a serving cell may be a cell for or on which the wireless device is configured and/or to which it is synchronized and/or has performed an access procedure, e.g., a random access procedure, and/or in relation to which it is in a RRC_connected or RRC_idle state, e.g., in case the network node and/or wireless device and/or network node follow the LTE-standard. One or more carriers (e.g., uplink and/or downlink carrier/s and/or a carrier for both uplink and downlink) may be associated to a cell.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide adapting SSB transmission such as by transitioning to a SSB provision scheme.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include an adapting unit 32 which is configured to perform one or more network node 16 functions as described herein such as with respect to adapting SSB transmission such as by transitioning to a SSB provision scheme. A wireless device 22 is configured to include a SSB unit 34 which is configured to perform one or more wireless device 22 functions as described herein such as with respect to adapting SSB transmission such as by transitioning to a SSB provision scheme.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to transmit, receive, forward, relay, process, analyze, store, instructions, etc., information related to adapting SSB transmission such as by transitioning to a SSB provision scheme.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include adapting unit 32 configured to perform one or more network node 16 functions as described herein such as with respect to adapting SSB transmission such as by transitioning to a SSB provision scheme.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a SSB unit 34 configured to perform one or more wireless device 22 functions as described herein such as with respect to adapting SSB transmission such as by transitioning to a SSB provision scheme.

Figure 2:
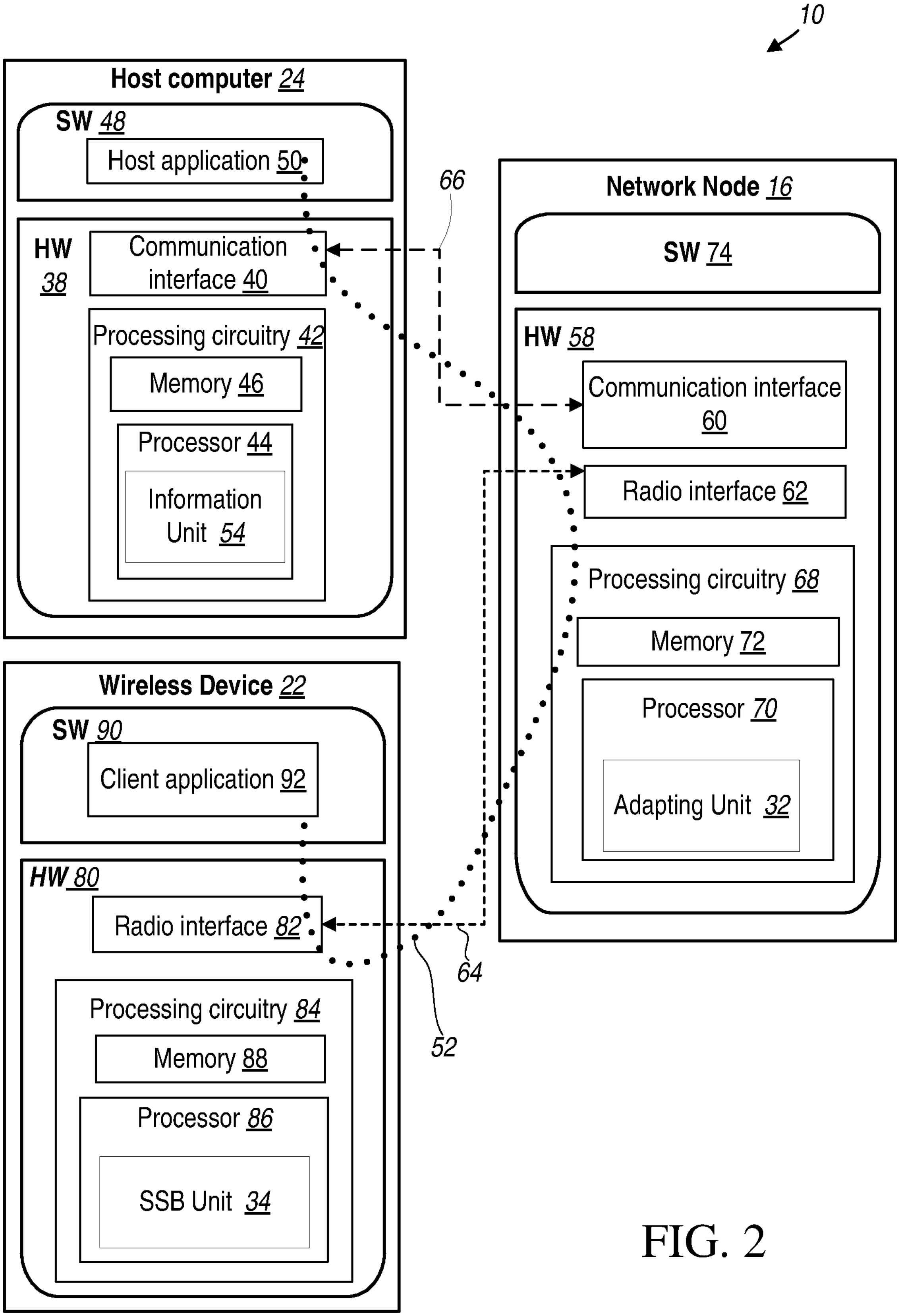
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as adapting unit 32, and SSB unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
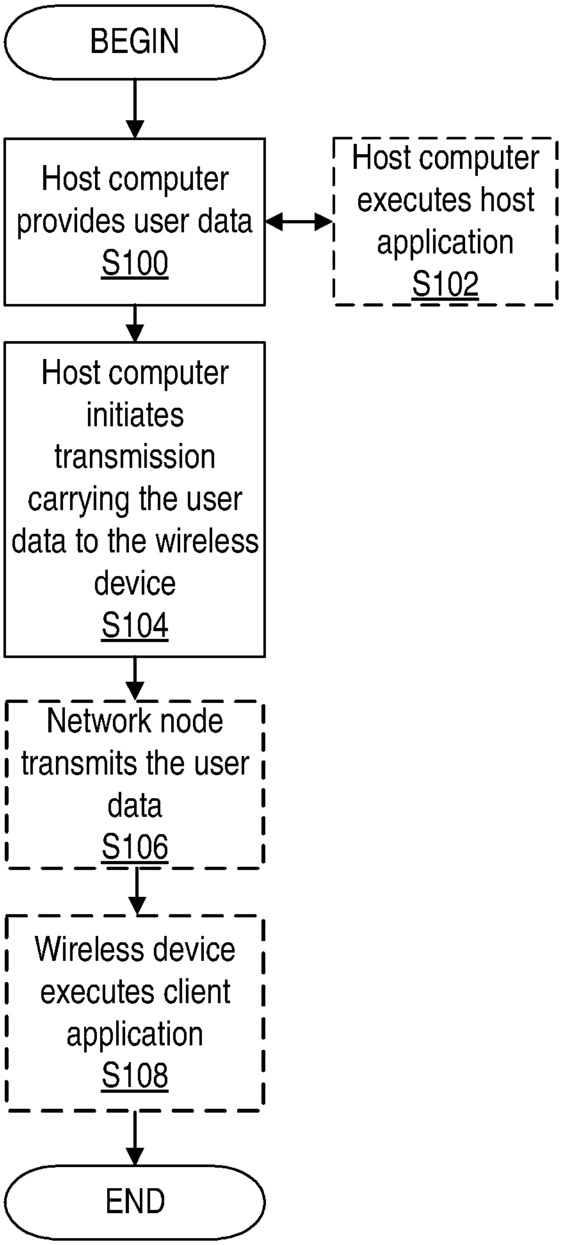
FIG. 3 is a flowchart illustrating example methods implemented in a communication system including a host computer, a network node and a wireless device for executing a client application at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 4:
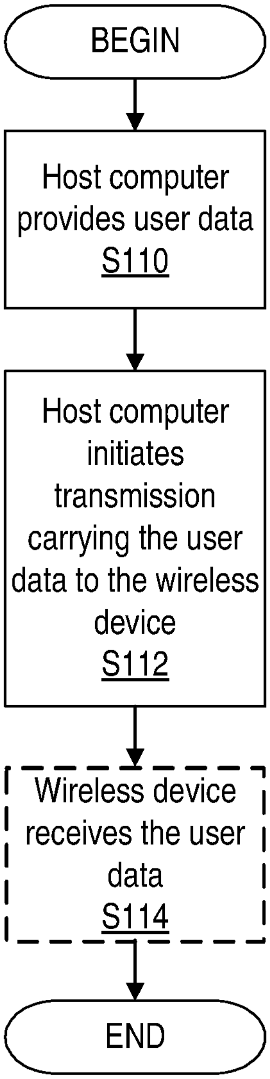
FIG. 4 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
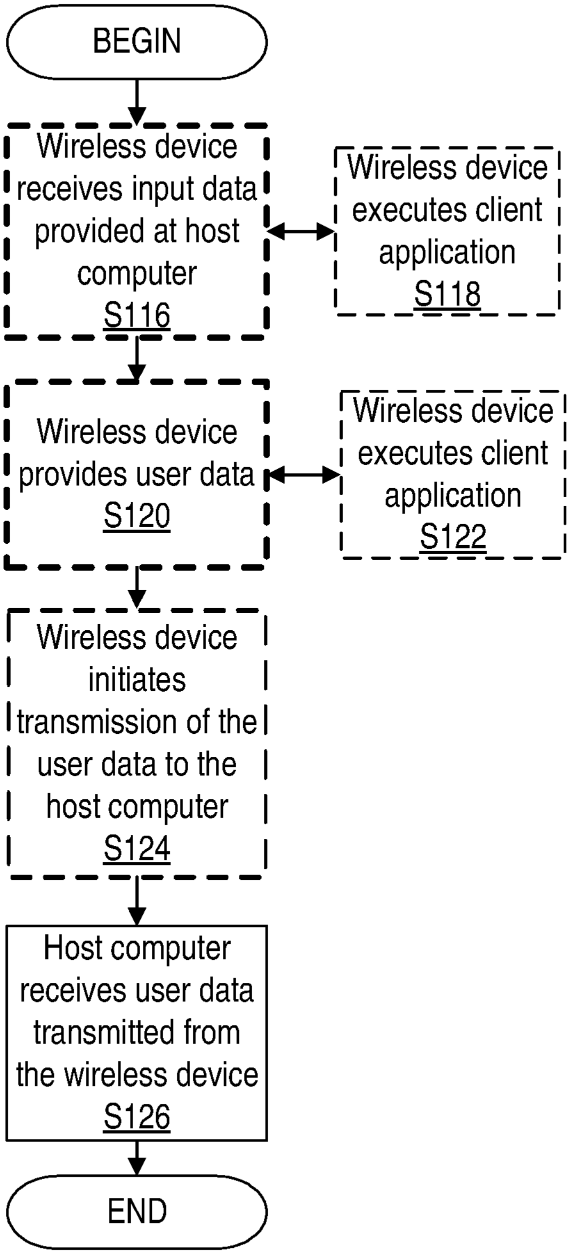
FIG. 5 is a flowchart illustrating example methods implemented in a communication system including a host computer, a network node and a wireless device for receiving user data from the wireless device at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
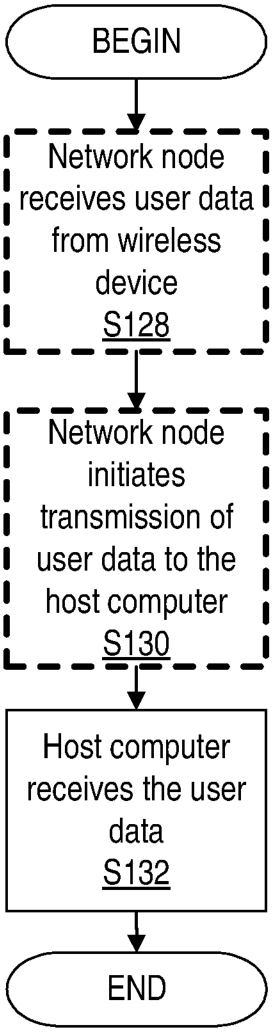
FIG. 6 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
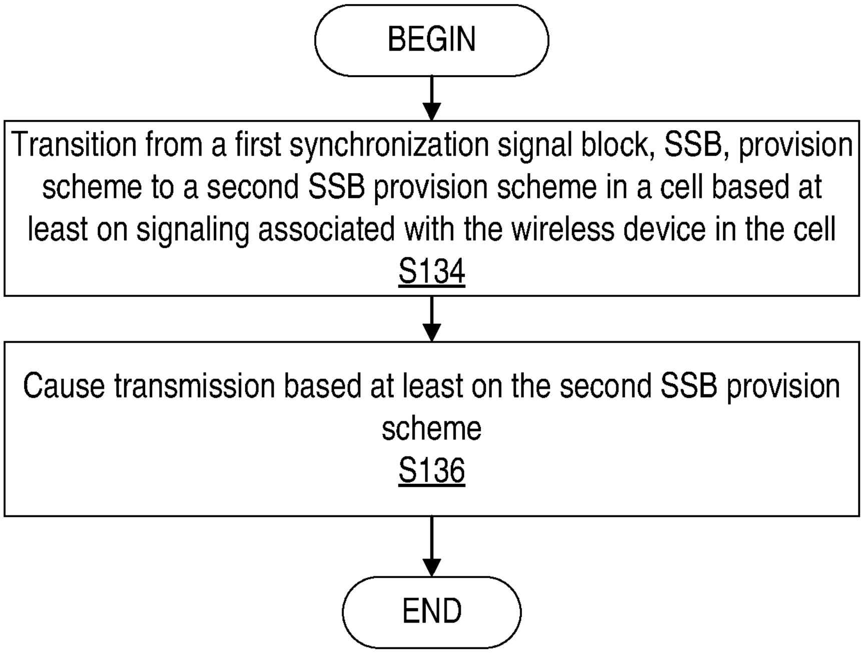
FIG. 7 is a flowchart of an example process in a network node according to some embodiments of the present disclosure.

FIG. 7 is a flowchart of an example process in a network node 16 according to some embodiments of the present disclosure. One or more blocks described herein may be performed by one or more elements of network node 16 such as by one or more of processing circuitry 68 (including the adapting unit 32), processor 70, radio interface 62 and/or communication interface 60. Network node 16 is configured to transition (Block S134) from a first synchronization signal block, SSB, provision scheme to a second SSB provision scheme in a cell based at least on signaling associated with the wireless device 22 in the cell, as described herein. Network node 16 is configured to cause (Block S136) transmission based at least on the second SSB provision scheme, as described herein.

According to one or more embodiments, the signaling includes one of: a polling response, location information, a request for a SSB provisions scheme change, as described herein. According to one or more embodiments, compared to the first SSB provision scheme, the second SSB provision scheme includes at least one of a different number of transmitted SSBs, a different rate at which at least one SSB is transmitted, and a different output power of at least one transmitted SSBs. According to one or more embodiments, the first SSB provision scheme is a lower power scheme compared to the second SSB provision scheme.

Figure 8:
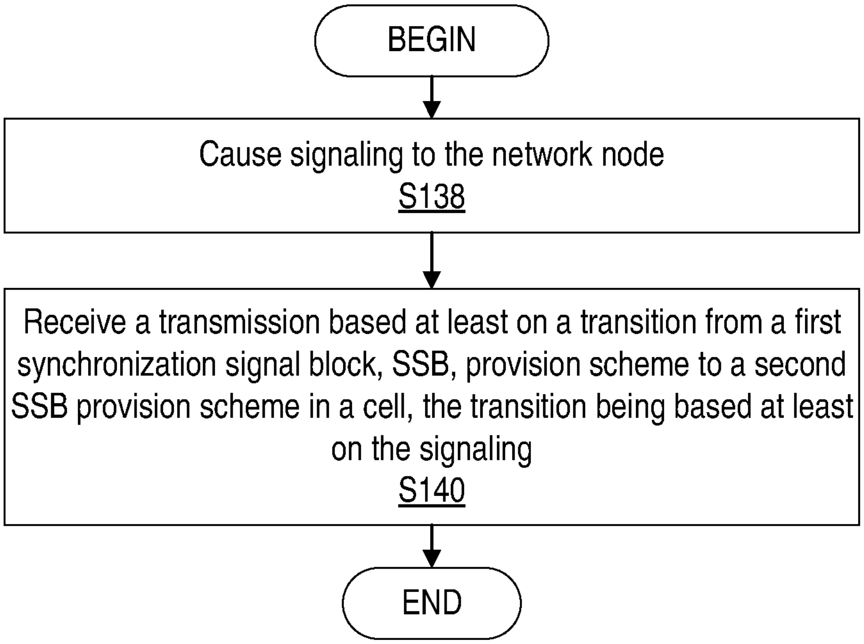
FIG. 8 is a flowchart of an example process in a wireless device according to some embodiments of the present disclosure.

FIG. 8 is a flowchart of an example process in a wireless device 22 according to some embodiments of the present disclosure. One or more blocks described herein may be performed by one or more elements of wireless device 22 such as by one or more of processing circuitry 84 (including the SSB unit 34), processor 86, radio interface 82 and/or communication interface 60. Wireless device 22 is configured to cause (Block S138) signaling to the network node, as described herein. Wireless device 22 is configured to receive (Block S140) a transmission based at least on a transition from a first synchronization signal block, SSB, provision scheme to a second SSB provision scheme in a cell, the transition being based at least on the signaling.

According to one or more embodiments, the signaling includes one of a polling response, location information and a request for a SSB provisions scheme change. According to one or more embodiments, compared to the first SSB provision scheme, the second SSB provision scheme includes at least one of: a different number of transmitted SSBs, a different rate at which at least one SSB is transmitted, a different output power of at least one transmitted SSBs. According to one or more embodiments, the first SSB provision scheme is a lower power scheme compared to the second SSB provision scheme.

Figure 9:
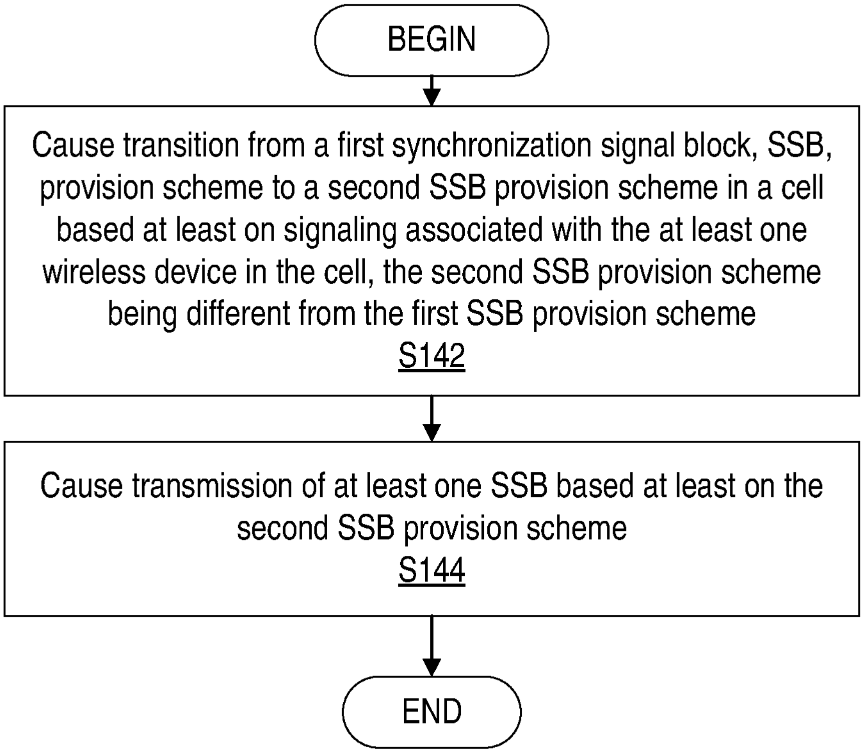
FIG. 9 is a flowchart of another example process in a network node according to some embodiments of the present disclosure.

FIG. 9 is a flowchart of another example process in a network node 16 according to some embodiments of the present disclosure. One or more blocks described herein may be performed by one or more elements of network node 16 such as by one or more of processing circuitry 68 (including the adapting unit 32), processor 70, radio interface 62 and/or communication interface 60. Network node 16 is configured to cause transition (Block S142) from a first synchronization signal block, SSB, provision scheme to a second SSB provision scheme in a cell based at least on signaling associated with the at least one wireless device 22 in the cell, where the second SSB provision scheme is different from the first SSB provision scheme, and to cause transmission (Block S144) of at least one SSB based at least on the second SSB provision scheme. According to one or more embodiments, the first SSB provision scheme is associated with either a lower energy consumption in the first network node 16 compared to the second SSB provision scheme, or a higher energy consumption in the first network node compared to the second SSB provision scheme. According to one or more embodiments, the signaling associated with the at least one wireless device 22 in the cell includes at least one of at least one polling response, location information, a measurement result, and a first request for a SSB provision scheme transition. According to one or more embodiments, the measurement result is based on at least one of at least one SSB transmitted by the first network node 16, and at least one SSB transmitted by at least one other network node. According to one or more embodiments, the measurement result is based on at least one of at least one SSB of the first SSB provision scheme and/or the second SSB provision scheme, at least one SSB of at least one other SSB provision scheme associated with a serving network node, and at least one SSB of at least one other SSB provision scheme associated with a neighboring network node.

According to one or more embodiments, the first request for the SSB provision scheme transition is associated with a measurement value of at least one SSB of the first SSB provision scheme falling below a threshold value. According to one or more embodiments, the threshold value is one of configured by the first network node 16, and set by the at least one wireless device 22 in the cell. According to one or more embodiments, the processing circuitry 68 is further configured to start a prohibit timer at a first time upon receiving the first request for the SSB provision scheme transition, where the prohibit timer is configured to prohibit additional transition requests while the prohibit timer is running, and transition from the second SSB provision scheme to another SSB provision scheme based on a second request for a SSB provision scheme transition being received at a second time, where the prohibit timer is expired at the second time. According to one or more embodiments, at least one of the at least one polling response is associated with a number of wireless devices 22 in the cell being in at least one of an inactive state and an idle state. According to one or more embodiments, at least one of the at least one polling response is associated with a group of wireless devices 22 in the cell.

According to one or more embodiments, the first request for the SSB provision scheme transition is received from one of the at least one wireless device 22 in the cell, and at least one neighboring network node 16. According to one or more embodiments, the processing circuitry 68 is further configured to cause transmission of a second request to a neighboring network node 16 for the neighboring network node 16 to transition from a third SSB provision scheme to a fourth SSB provision scheme based on the first network node 16 being already configured with a maximum SSB power when receiving the first request from the at least one wireless device 22 in the cell for the SSB provision scheme transition. According to one or more embodiments, the second SSB provision scheme differs from the first SSB provision scheme based on at least one of a different number of transmitted SSBs, a different rate at which at least one SSB is transmitted, a different periodicity at which at least one SSB is transmitted, a different output power of at least one transmitted SSB, a different time domain position of at least one transmitted SSB, a different beam gain, a different coverage area of the cell, and a different number of antenna ports.

Figure 10:
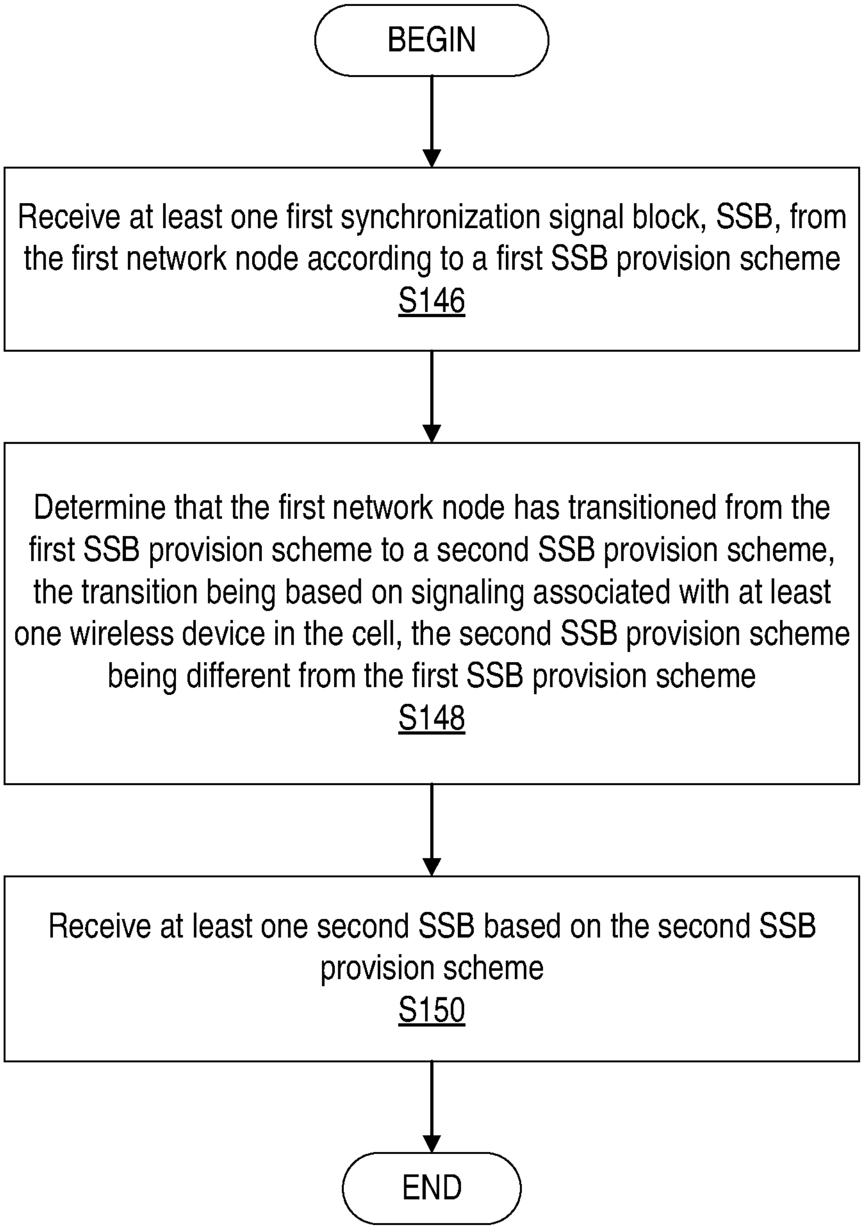
FIG. 10 is a flowchart of another example process in a wireless device according to some embodiments of the present disclosure.

FIG. 10 is a flowchart of an example process in a wireless device 22 according to some embodiments of the present disclosure. One or more blocks described herein may be performed by one or more elements of wireless device 22 such as by one or more of processing circuitry 84 (including the SSB unit 34), processor 86, radio interface 82 and/or communication interface 60. Wireless device 22 is configured to receive (Block S146) at least one first synchronization signal block, SSB, from the first network node 16 according to a first SSB provision scheme. Wireless device 22 is configured to determine (Block S148) that the first network node 16 has transitioned from the first SSB provision scheme to a second SSB provision scheme, where the transition is based on signaling associated with at least one wireless device 22 in the cell, and the second SSB provision scheme is different from the first SSB provision scheme. Wireless device 22 is configured to receive (Block S150) at least one second SSB based on the second SSB provision scheme.

According to one or more embodiments, the first SSB provision scheme is associated with either a lower energy consumption in the first network node 16 compared to the second SSB provision scheme, or a higher energy consumption in the first network node compared to the second SSB provision scheme. According to one or more embodiments, the signaling associated with the at least one wireless device 22 in the cell includes at least one of at least one polling response, location information associated, a measurement result, and a first request for a SSB provision scheme transition. According to one or more embodiments, the measurement result is based on at least one of at least one SSB transmitted by the first network node 16, and at least one SSB transmitted by at least one other network node. According to one or more embodiments, the measurement result is based on at least one of at least one SSB of the first SSB provision scheme and/or the second SSB provision scheme, at least one SSB of at least one other SSB provision scheme associated with a serving network node, and at least one SSB of at least one other SSB provision scheme associated with a neighboring network node.

According to one or more embodiments, the first request for the SSB provision scheme transition is associated with a measurement value of at least one SSB of the first SSB provision scheme falling below a threshold value. According to one or more embodiments, the threshold value is one of configured by the first network node 16, and set by the at least one wireless device 22 in the cell. According to one or more embodiments, the processing circuitry 84 is further configured to start a prohibit timer at a first time upon causing transmission of the first request for the SSB provision scheme transition, where the prohibit timer is configured to prohibit additional transition requests while the prohibit timer is running, and cause transmission at a second time of a second request for a SSB provision scheme transition based on the prohibit timer being expired at the second time.

According to one or more embodiments, the processing circuitry 84 is further configured to receive a polling request from at least one of the first network node 16 and a neighboring network node, and cause transmission of at least one of the at least one polling response based on the received polling request. According to one or more embodiments, the at least one of the at least one polling response is associated with the at least one wireless device 22 in the cell being in at least one of an inactive state and an idle state. According to one or more embodiments, the wireless device 22 is associated with a group of wireless devices 22 in the cell, and the polling request is associated with the group of wireless devices 22. According to one or more embodiments, the second SSB provision scheme differs from the first SSB provision scheme based on at least one of a different number of transmitted SSBs, a different rate at which at least one SSB is transmitted, a different periodicity at which at least one SSB is transmitted, a different output power of at least one transmitted SSB, a different time domain position of at least one transmitted SSB, a different beam gain, a different coverage area of the cell, and a different number of antenna ports. According to one or more embodiments, the processing circuitry 84 is further configured to determine that the first network node is configured with the first SSB provision scheme based on at least one of implicit signaling, and explicit signaling.

One or more wireless device 22 functions described below may be performed by one or more of processing circuitry 84, processor 86, SSB unit 34, radio interface 82, etc. One or more network node 16 functions described below may be performed by one or more of processing circuitry 68, processor 70, adapting unit 32, etc.

Having generally described arrangements for adapting SSB transmission such as by transitioning to a SSB provision scheme, details for these arrangements, functions and processes are provided as follows, and which may be implemented by the network node 16, wireless device 22 and/or host computer 24. One or more network node 16 functions described herein may be performed by one or more of processing circuitry 68, processor 70, adapting unit 32, radio interface 62, etc. One or more wireless device 22 functions described herein may be performed by one or more of processing circuitry 84, processor 86, SSB unit 34, radio interface 82, etc.

Some embodiments provide for adapting SSB transmission such as by transitioning to a SSB provision schemes.

In NR or 3GPP Release (Rel)-15-17, an NR network node 16 (also referred to as network node 16) can be configured by the operator with up to 64 SSBs. The configured SSBs in a cell have all the same periodicity and output power. The network node 16 provides information to potential wireless devices 22 in its cell about how many/which SSBs and at what rate are transmitted within the serving cell and neighboring cells. These SSBs are provided at the same rate irrespective of whether any wireless device 22 is present in a given cell.

Figure 11:
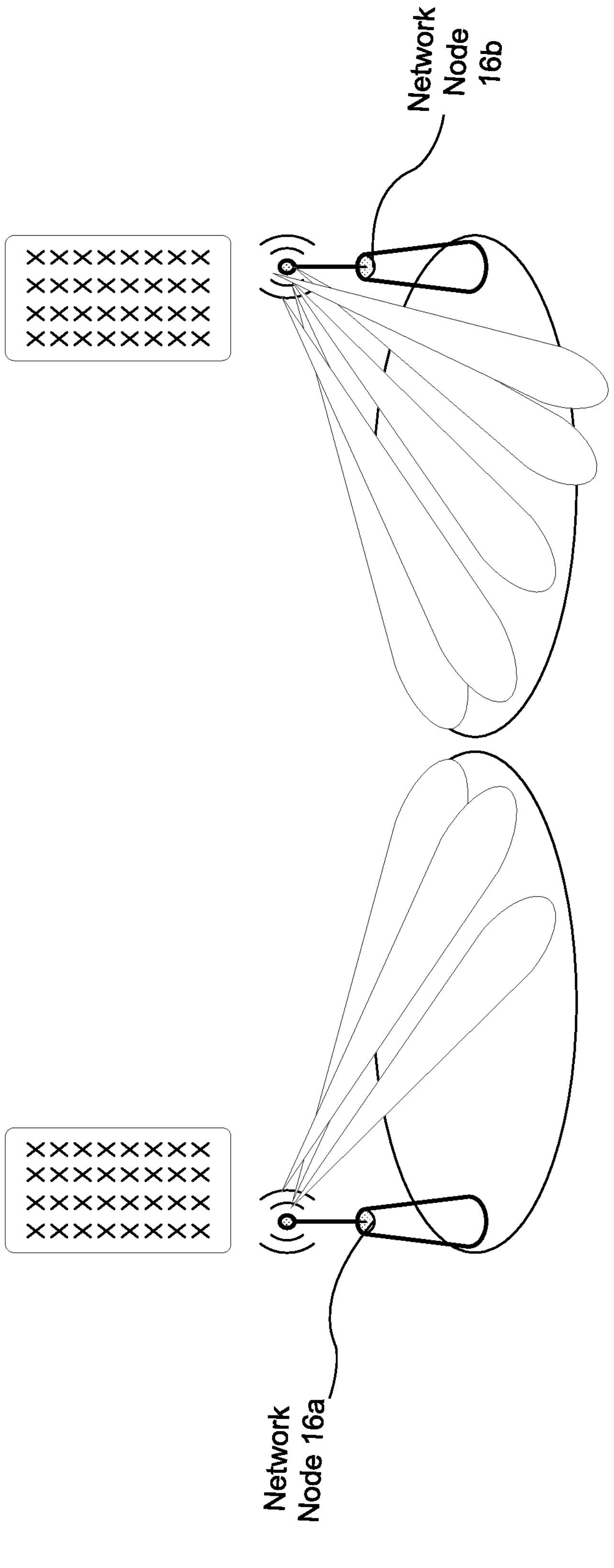
FIG. 11 is a diagram of two neighboring network nodes 16 configured with different number of SSBs where all SSBs associated with the two network nodes 16 are transmitted at the same rate irrespective of whether any wireless device 22 is present in the cells.

FIG. 11 is a diagram of two neighboring network nodes 16 configured with different number of SSBs. All SSBs are transmitted at the same rate irrespective of whether any wireless device 22 is present in the cells.

One or more embodiments descried herein is configured to change/modify the conventional provision scheme where all SSBs are constantly provided at a rate irrespective of wireless device presence. In one or more embodiments, change/modify the convention provision scheme may correspond to transitioning into a specific provision scheme as described herein.

In one embodiment, network node 16 temporarily configures for a certain cell, only a few SSBs (or less than all configurable SSBs) and/or at a lower rate (e.g., lower rate than another scheme) and/or with lower output power (e.g., lower power than another scheme). The network node might have knowledge about potential presence and coverage of RRC IDLE/INACTIVE mode wireless devices 22 in a cell or part thereof and only provide the SSBs at the necessary/required rate with necessary/required output power to serve the wireless devices with good enough quality (e.g., with quality meeting a threshold). For example, if the network node 16 assumes/knows that there are currently no wireless devices 22 in parts of cell, then no SSBs are provided in those parts of the cell. Alternatively, for example, if the network node 16 assumes/knows that there are currently no wireless devices 22 at a cell edge, network node 16 can lower the output power used for the transmitted SSBs in the cell or change beamforming configurations so as to transmit beams with lower beam gain. That is, for example, in one or more embodiments, network node 16 changes the coverage area of a cell with respect to transmitted SSBs (e.g., SSB are no longer transmitted in the entire cell but only a portion of the cell) by modifying one or more parameters associated with SSB transmission.

Figure 12:
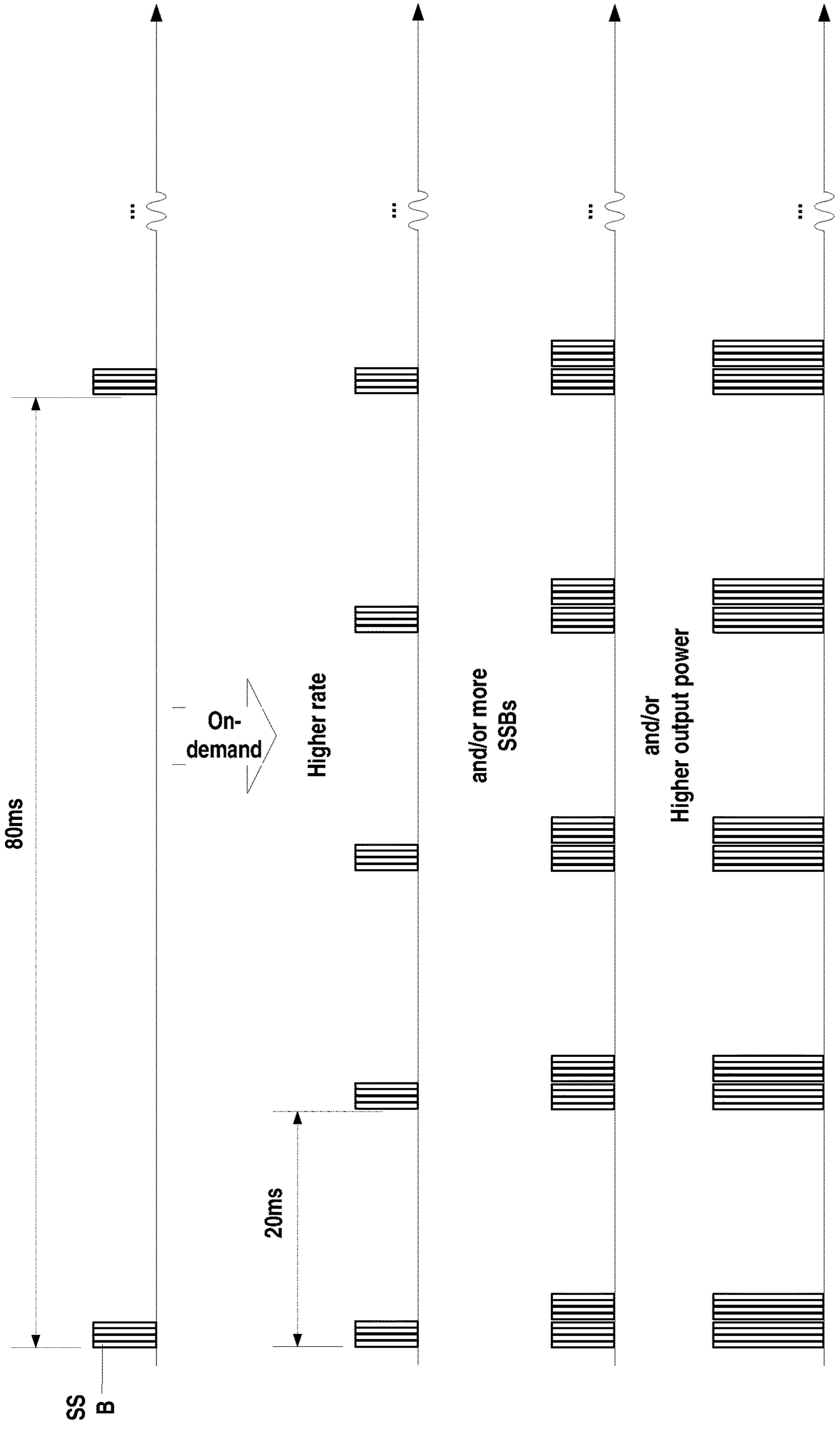
FIG. 12 is a diagram of a case where a network node initially provides few SSBs at a low rate and, based on demand, the network node changes its SSB provision scheme.

The network node 16 further provides the possibility for the wireless devices 22 to demand/request a better or different SSBs provision scheme. In one or more embodiments, the demand/request corresponds to signaling from the wireless device 22. Such demand can be performed via a specific preamble sequence, or a set of sequences for different purposes (e.g., for rate, number of SSBs, higher output power). Alternately, such demand can be performed via UL control channel (e.g., on physical uplink control channel (PUCCH)) or UL shared channel (e.g., on physical uplink shared channel (PUSCH)) on resources pointed out or preconfigured by the network node 16 or via RRC signaling, potentially the latter two (PUCCH/PUSCH or RRC) with piggybacked measurement results on current set of SSBs (e.g., each currently seen SSB's RSRP, RSRQ, SINR, or alike) from serving and/or neighboring cell(s). Through such piggybacked measurement results, the network node 16 can have a better idea about wireless device 22 whereabouts. Based on such demand, the network node 16 then adapts its SSB provision scheme. FIG. 12 is a diagram where the network node 16, based on demand from the wireless device 22, adapts its SSB provision scheme such that the SSBs are provided at a higher rate, and/or more SSBs are transmitted (utilizing more antenna ports), and/or are transmitted with higher output power. In addition, the network node 16 may also change the time domain position of the transmitted SSB, e.g., by changing the value of the ssb-PositionInBurst and/or periodicity AndOffset parameters, to minimize the interference that may be caused to or may be obtained from the other cells.

The network node 16 may, however, occasionally switch to full (or higher) transmission power, high rate, and high number of SSBs to capture potential wireless devices 22. For example, such occasional scheme change can be performed at time scales in the range of, for example, once per second. If the wireless devices 22 are knowledgeable of such scheme, the wireless devices 22 may, when in lack of coverage, maintain the search effort for potential SSBs during such period. When such scheme is detected by wireless devices 22, the wireless devices 22 may then connect to the network node 16 and announce their presence (i.e., an implicit polling of wireless devices 22). In one or more embodiments, announcing its presence may correspond to signaling from the wireless device 22. The knowledge about idle mode wireless device 22 presence may be acquired by the network node 16 based on historical information, and/or based on the implicit or explicit polling of wireless device 22 presence in the cell or parts thereof. Such explicit polling can be performed in the coverage area for one or more of the SSBs through:

- an indicator via DCI, e.g., the paging DCI or a dedicated polling DCI, or one of the existing DCIs, e.g., scheduling DCIs;
- an indicator in the paging message;
- an indicator in a Paging Early Indicator or WUS (Wakeup signal);
- polling based on a pattern, e.g., periodic polling through configured grants.

In one or more embodiments, the explicit polling may include signaling from the wireless device 22.

Where any of the above polling can be either intended for a specific wireless device 22, a (sub) group of wireless devices 22, or all the wireless devices 22 of the cell. If a wireless devices 22 are polled either explicitly or implicitly (e.g., wireless device 22 belongs to the (sub)-group that has been explicitly polled), it responds to the network node 16 to announce its presence. A potential polling response from the wireless device 22 can be either:

- a layer 1 message such as a preamble, e.g., a preamble resource (in a predefined/preconfigured T/F/sequence/shift set) that is not interpreted by the network node 16 as a RA request and no RA procedure is triggered.
- a layer 1 UL control message such as a PUCCH/PUSCH message where the PUCCH7PUSCH resources are pointed out by the polling message or via broadcast configuration. Further this polling response from wireless device 22 may carry measurement results on current set of SSBs from serving and neighboring cells. Alternatively, the resources can be configured for the wireless device 22 through higher layer signaling e.g., RRC reconfiguration, e.g., as configured UL grants.
- a higher layer message (e.g., an RRC message) which may also carry SSB measurement results. The wireless device 22 may provide such RRC message after connecting to the network node 16.

Based on the polling response, the network node 16 determines wireless device 22 presence in IDLE/INACTIVE and can adapt the SSB transmission scheme based on the determination. For example, if the network node 16 detects wireless device 22 presence in one or more parts of the cell in which SSBs were not provided earlier (e.g., in an earlier transmission according to a first SSB scheme), or were provided less frequently or with lower power, the network node 16 may then start transmitting SSBs covering the area, or increase the provision rate or TX power, such as according to a second SSB scheme. Note that such adaptation can be performed as a network node 16 proprietary mechanism or it included as part of a standard, e.g., 3GPP standard.

The network node 16 SSB scheme adaptation may additionally or alternatively be based on wireless device 22 demands/requests. For example, the wireless devices 22 may have been configured (via broadcast or dedicated configuration) to be allowed to demand a higher SSB provision rate and/or higher output power and/or more SSBs. Such a demand/request can be performed through methods configured by the network node 16, e.g., via one or more of:

- a specific preamble sequence, or a set of sequences for different purposes (e.g., for rate, number of SSBs, higher output power), where the preamble may not trigger a TA procedure,
- an UL control message (e.g., PUCCH/PUSCH message), potentially with piggybacked measurement results on current set of SSBs from serving and neighboring cells
- RRC signaling (e.g., as part of User Assistance Information, or any other existing/new RRC message), potentially with piggybacked measurement results on current set of SSBs (e.g., each SSBs RSRP, RSRQ, SINR, or alike) from serving and/or neighboring cell(s)

Figure 13:
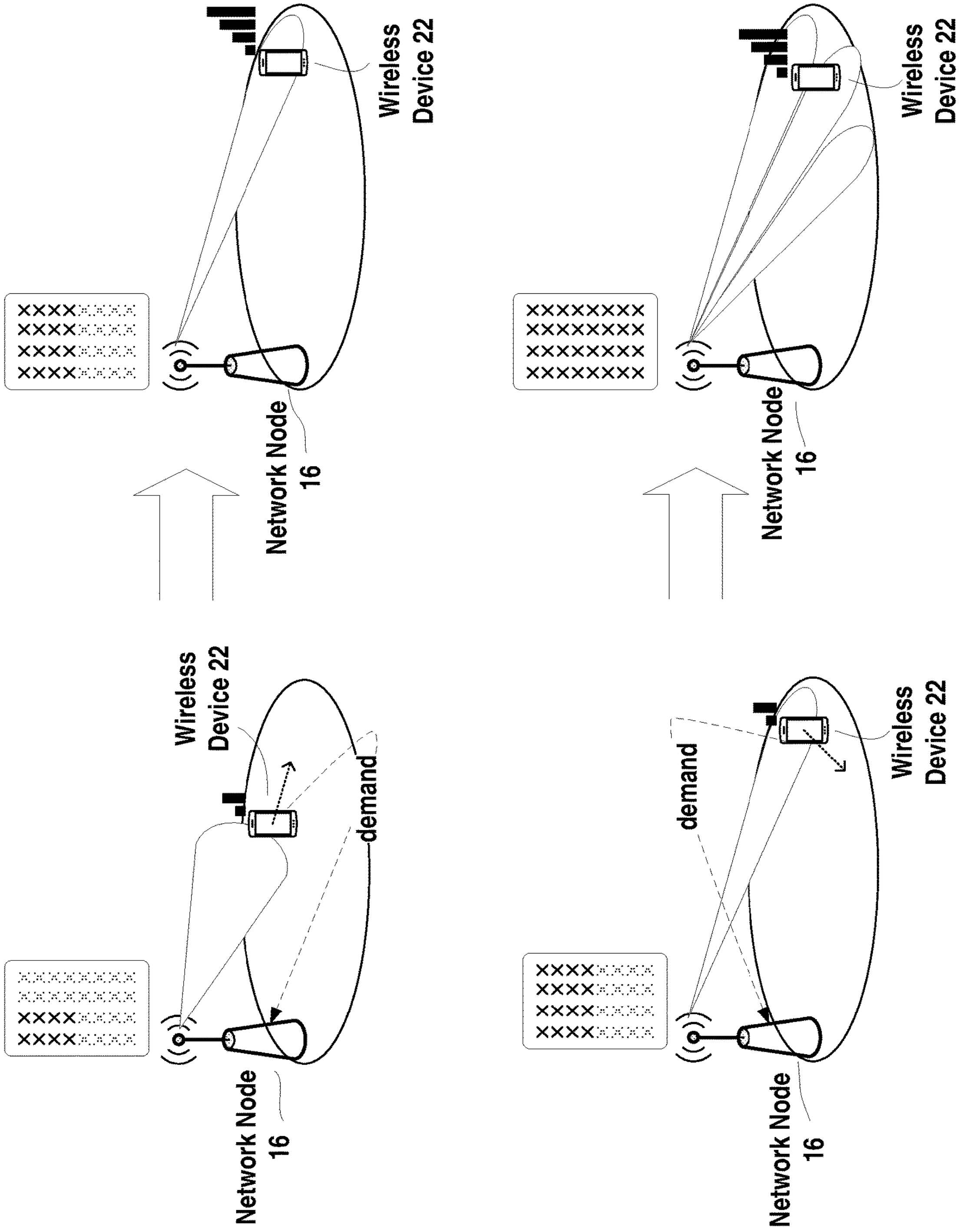
FIG. 13 is a diagram illustrating a scenario in which the network node initially transmits one SSBs and potentially at a low output power.

Some examples are described with respect to FIG. 13 for network node SSB scheme adaptation based on wireless device 22 demand/polling response. In particular, FIG. 13 illustrates a scenario in which the network node 16 initially transmits one SSBs (only a few ports are used thereby saving energy) and potentially at a low output power. The wireless device 22 on the left-hand side/part of the sub-figures of FIG. 13 in this example is moving away from the SSB coverage. The wireless device 22 detects this condition since the measurements on SSB fall below a certain threshold (either internal threshold or preconfigured by the network node 16) and therefore demands for the SSB transmission scheme to be change/modified/reconfigured/etc. Based on the received demand, utilizing the received message characteristics (e.g., Timing advance, Angle of arrival, the contents of the message such as number of SSBs measured by the wireless device 22, etc.) the network node 16 then adapts/changes/reconfigures the scheme. This is illustrated on the right-hand side of the sub-figures of FIG. 13 where the network node 16 involves/uses/configures/etc. more ports to cover the wireless device 22 better via more SSBs and/or higher output power and/or rate. For example, "better" may refer to one or more of increased coverage area, increased signal metrics, etc.

In one or more embodiments, the network node 16 at a certain target layer/frequency in the energy saving mode may not transmit any SSBs but the network node 16/network has defined a request window for wireless devices 22 to request SSB transmission, e.g., via special Physical Random Access Channel (PRACH) transmission. The request window may be provided via cells on other layers/frequencies, e.g., the coverage layer. The request by the wireless device 22 may be transmitted on the target layer, where the network node 16 wakes up for request window monitoring, or on the coverage layer, where the target layer network node 16 can remain in deep energy saving mode for extended time.

Figure 14:
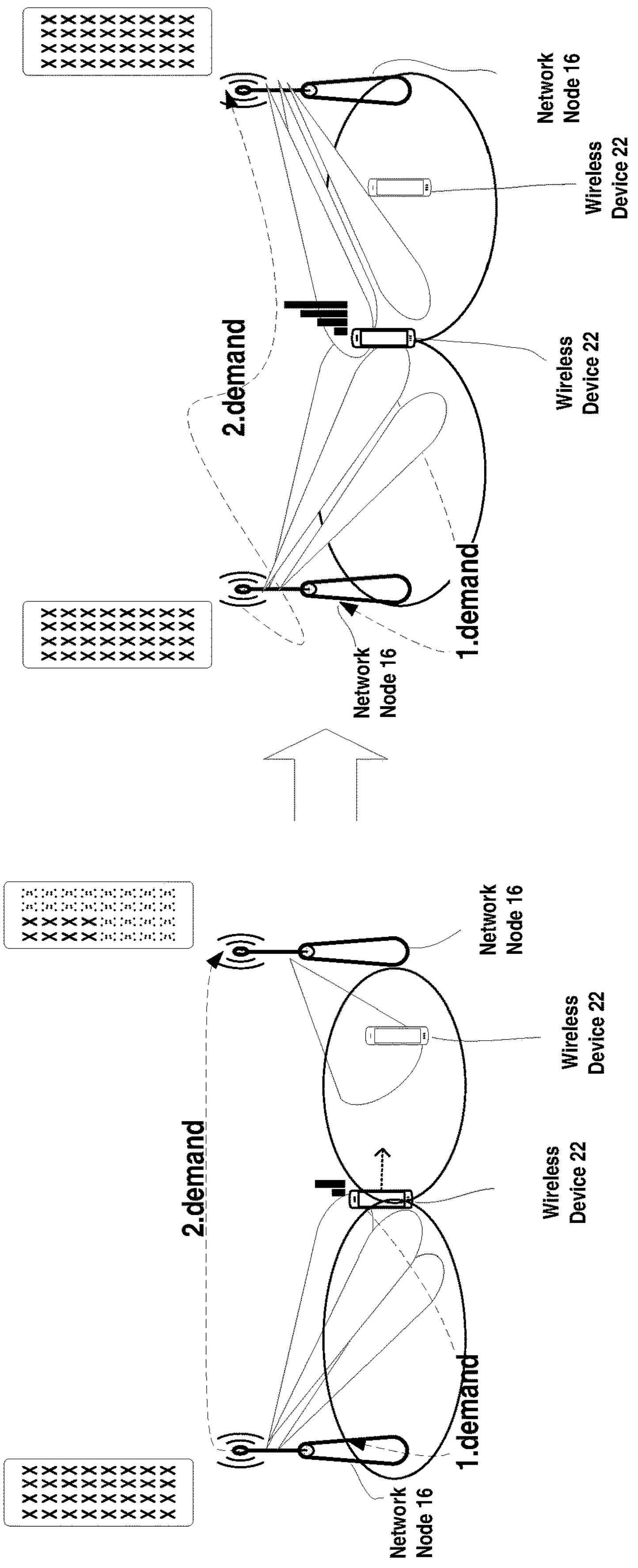
FIG. 14 is a diagram where a wireless device initially demands SSB scheme changes from the serving cell.

In one or more embodiments, the neighboring network nodes 16 collaborate such that first network node 16 can demand a SSB provision scheme change from a second neighboring network node 16. FIG. 14 is a diagram where the wireless devices 22 initially demands SSB scheme change from the serving cell. However, as the serving network node 16 has already maxed out on its provision scheme, the serving network node 16 demands/requests from the neighboring network node 16 to change its provision scheme to serve the wireless device 22 on the border. In another example (not shown in FIG. 14), the first network node 16 may also, upon request from the wireless device 22 to increase the SSB power, request the second network node 16 to reduce its SSB power to improve the wireless device 22's SINR, e.g., as the first network node 16 has already maxed out it's SSB power.

In one or more embodiments, the network node 16/network may dynamically control allowing/disallowing of the demand/request messages and/or rate thereof. This can be performed through prohibit timers, for example, meaning that once the wireless device 22 has demanded/requested, the wireless device 22 may not demand again during a prohibit timer. Alternately, the dynamic control of allowing/disallowing (e.g., prohibiting) demand messages can be performed through a broadcast prohibit indicator whereby if set by the network node 16, the wireless devices 22 are not allowed to demand scheme change. This can be useful when, for example, the network node 16 is not able to change the scheme further (e.g., already maxed out SSB provision rate/output power/number according to network node 16 hardware limitations). Such a prohibition may also be implicit, i.e., while a certain pattern is active (e.g., already 64 beams configured with a certain output power configured), the wireless device 22 is not allowed to request scheme change. Such a prohibition may also be performed on an individual wireless device 22 basis or per (sub) group of wireless devices 22.

Additionally, a predetermined application delay can also be configured, e.g., through higher layer configuration or through a implemented in a 3GPP standard, in which, the wireless device 22 and the network node 16 is not expecting the change on the SSB configuration. When the application delay ends, the network node 16 may then change the SSB configuration according to the wireless device 22 request/demand. Note that in doing so, the network node 16 may also be allowed to have a certain configuration limit. For example, the network node 16 may first configure the wireless device 22 with SSB periodicity of 40 ms. The wireless device 22 may then request/demand a higher SSB rate which the network node 16 may need to follow and thus, the network node 16 changes the SSB periodicity to 20 ms at most from the end of the application delay. However, if the wireless device 22 still demands/requests an even higher rate, the network node 16 may then be allowed to ignore the request. The mentioned configuration limit may in one approach be obtained from implementation in a 3GPP standard (i.e., preconfigured according to the 3GPP standard) or in another approach may also be configurable by the network node 16/network.

In an additional aspect, the wireless device 22 may also be configured with a timer, during which the SSB configuration applies. The timer can be restarted, e.g., when the wireless device 22 requests the same configuration of the previous request. Upon the timer expiration, the network node 16/network may apply its default/previous SSB configuration.

SOME EXAMPLES

Example 1. Method in a network node 16 (gNB) for SSB provision, comprising:

the gNB dynamically/semi-statically adapts the SSB provision scheme in a cell, where scheme adaptation is at least one of:

a. Changing the number of SSBs transmitted
b. Changing the rate at which one or more of the SSBs are transmitted
c. Changing the output power of one or more of the transmitted SSBs Example 2. Example 1, where the adaptation to a lower rate/number/output power is based on NW/network node 16 internal knowledge of current location and number of wireless devices 22 in the cell.

Example 3. Example 1, where the adaptation to a lower or higher rate/number/output power is based on polling the presence of UEs in IDLE/INACTIVE state:

a. Where such polling can be done in the coverage area for one or more of the SSBs through at least one of:
    i. Implicitly through an SSB provision scheme (e.g., when a wireless device 22 detects a certain preconfigured scheme)
    ii. an indicator via DCI
    iii. an indicator in the paging message
    iv. a Paging Early Indicator or WUS (Wakeup signal)
    Where any of the above polling can be either intended for a specific wireless device 22, a (sub) group of wireless devices 22, or all the wireless devices 22 of the cell.
b. Where a potential polling response from the wireless device 22 can be one of:
    i. a layer 1 message such as a preamble
    ii. a layer 1 PUCCH/PUSCH message where the PUCCH/PUSCH resources are pointed out by the polling message or via broadcast configuration. Further, this polling response from wireless device 22 may carry measurement results on current set of SSBs from serving and neighboring cells
    iii. a higher layer message (e.g., an RRC message) which may also carry SSM measurement results.

Example 4. Example 1, where the NW/network node 16 provides information to wireless devices 22 about the possibility to demand a higher rate/number/output power, where such demand can be performed via one or more of:

a. a specific preamble sequence, or a set of sequences for different purposes (e.g., for rate, number of SSBs, higher output power)
b. an UL control message (e.g., PUCCH/PUSCH message), potentially with piggybacked measurement results on current set of SSBs from serving and neighboring cells
c. RRC signaling, potentially with piggybacked measurement results on current set of SSBs (e.g., each SSBs RSRP, RSRQ, SINR, or alike) from serving and/or neighboring cell(s).

Example 5. Example 1 and 4, where the adaptation to a higher rate/number/output power is based on demand from wireless devices 22.

Example 6. The Example any one of Examples 1-5, where a first network node 16 (e.g., gNB) requests a second neighboring network node 16 (e.g., gNB) to adapt the SSB provision scheme in the second network node cell.

Example 7. Method in a wireless device 22 for SSB provision steering, comprising at least one of:

based on NW (e.g., network node 16) requests or predefined procedures, providing presence information to the NW, and/or based on wireless device 22's needs or fulfillment of certain conditions, and optionally based on NW explicit or implicit permissions, requesting a SSB scheme change.

Example 8. Example 7, where the conditions may be:

a. Wireless device 22 currently measured SSBs drop below certain threshold where threshold may be configured by the NW or set by the wireless device itself to fulfill good coverage requirements
b. Wireless device 22 synchronization requires SSB provision at a higher rate than currently provided.

One or more embodiments described herein provide for one or more methods where the network node can, for certain SSBs (e.g., underutilized SSBs), change the provision scheme so that they are either not transmitted or transmitted with longer periodicities and/or lower output power. The network node can turn off some hardware (HW) modules, e.g., antenna ports during inactivity or low activity periods and thereby achieve energy saving. The network node can also lower the output power and thereby both save energy and create less noise/interference in the overall system.

SOME ADDITIONAL EXAMPLES

Example A1. A network node 16 configured to communicate with a wireless device (WD), the network node 16 configured to, and/or comprising a radio interface and/or comprising processing circuitry configured to:

transition from a first synchronization signal block, SSB, provision scheme to a second SSB provision scheme in a cell based at least on signaling associated with the wireless device 22 in the cell; and cause transmission based at least on the second SSB provision scheme.

Example A2. The network node 16 of Example A1, wherein the signaling includes one of:

a polling response;
location information; and
a request for a SSB provisions scheme change.

Example A3. The network node 16 of Example A1, wherein, compared to the first SSB provision scheme, the second SSB provision scheme includes at least one of:

a different number of transmitted SSBs;
a different rate at which at least one SSB is transmitted; and
a different output power of at least one transmitted SSBs.

Example A4. The network node 16 of Example A1, wherein the first SSB provision scheme is a lower power scheme compared to the second SSB provision scheme.

Example B1. A method implemented in a network node 16 that is configured to communicate with a wireless device 22, the method comprising:

transitioning from a first synchronization signal block, SSB, provision scheme to a second SSB provision scheme in a cell based at least on signaling associated with the wireless device 22 in the cell; and causing transmission based at least on the second SSB provision scheme.

Example B2. The method of Example B1, wherein the signaling includes one of:

a polling response;
location information; and
a request for a SSB provisions scheme change.

Example B3. The method of Example B1, wherein, compared to the first SSB provision scheme, the second SSB provision scheme includes at least one of:

a different number of transmitted SSBs;
a different rate at which at least one SSB is transmitted; and
a different output power of at least one transmitted SSBs.

Example B4. The method of Example B1, wherein the first SSB provision scheme is a lower power scheme compared to the second SSB provision scheme.

Example C1. A wireless device 22 (WD) configured to communicate with a network node 16, the WD configured to, and/or comprising a radio interface and/or processing circuitry configured to:

cause signaling to the network node 16; and receive a transmission based at least on a transition from a first synchronization signal block, SSB, provision scheme to a second SSB provision scheme in a cell, the transition being based at least on the signaling.

Example C2. The wireless device 22 of Example C1, wherein the signaling includes one of:

a polling response;

location information; and a request for a SSB provisions scheme change.

Example C3. The wireless device 22 of Example C1, wherein, compared to the first SSB provision scheme, the second SSB provision scheme includes at least one of:

a different number of transmitted SSBs;

a different rate at which at least one SSB is transmitted; and a different output power of at least one transmitted SSBs.

Example C4. The wireless device 22 of Example C1, wherein the first SSB provision scheme is a lower power scheme compared to the second SSB provision scheme.

Example D1. A method implemented in a wireless device 22 (WD) that is configured to communicate with a network node 16, the method comprising:

causing signaling to the network node 16; and receiving a transmission based at least on a transition from a first synchronization signal block, SSB, provision scheme to a second SSB provision scheme in a cell, the transition being based at least on the signaling.

Example D2. The method of Example D1, wherein the signaling includes one of:

a polling response;

location information; and a request for a SSB provisions scheme change.

Example D3. The method of Example D1, wherein, compared to the first SSB provision scheme, the second SSB provision scheme includes at least one of:

a different number of transmitted SSBs;

a different rate at which at least one SSB is transmitted; and a different output power of at least one transmitted SSBs.

Example D4. The method of Example D1, wherein the first SSB provision scheme is a lower power scheme compared to the second SSB provision scheme.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first network node configured to communicate with at least one wireless device in a cell, the first network node comprising:

processing circuitry configured to:

cause transition from a first synchronization signal block, SSB, provision scheme to a second SSB provision scheme in a cell based at least on received signaling associated with the at least one wireless device in the cell, the second SSB provision scheme being different from the first SSB provision scheme;

cause transmission of at least one SSB based at least on the second SSB provision scheme; and the signaling associated with the at least one wireless device in the cell including at least one of:

at least one polling response associated with one or more wireless devices in the cell being in an inactive state or an idle state; or a first request for a SSB provision scheme transition from the at least one wireless device in the cell.

2. The first network node of claim 1, wherein at least one of the at least one polling response is associated with a group of wireless devices in the cell.

3. The first network node of claim 1, wherein the first request for the SSB provision scheme transition is received from one of:

the at least one wireless device in the cell; and at least one neighboring network node.

4. The first network node of claim 1, wherein the processing circuitry is further configured to:

start a prohibit timer at a first time upon receiving the first request for the SSB provision scheme transition, the prohibit timer being configured to prohibit additional transition requests while the prohibit timer is running; and transition from the second SSB provision scheme to another SSB provision scheme based on a second request for a SSB provision scheme transition being received at a second time, the prohibit timer being expired at the second time.

5. A method implemented in a first network node configured to communicate with at least one wireless device in a cell, the method comprising:

causing transition from a first synchronization signal block, SSB, provision scheme to a second SSB provision scheme in a cell based at least on received signaling associated with the at least one wireless device in the cell, the second SSB provision scheme being different from the first SSB provision scheme; and causing transmission of at least one SSB based at least on the second SSB provision scheme; and the signaling associated with the at least one wireless device in the cell including at least one of:

at least one polling response associated with one or more wireless devices in the cell being in an inactive state or an idle state; or a first request for a SSB provision scheme transition from the at least one wireless device in the cell.

6. The method of claim 5, further comprising:

starting a prohibit timer at a first time upon receiving the first request for the SSB provision scheme transition, the prohibit timer being configured to prohibit additional transition requests while the prohibit timer is running; and transitioning from the second SSB provision scheme to another SSB provision scheme based on a second request for a SSB provision scheme transition being received at a second time, the prohibit timer being expired at the second time.

7. The method of claim 5, wherein the first request for the SSB provision scheme transition is received from one of:

the at least one wireless device in the cell; and at least one neighboring network node.

8. A wireless device in a cell configured to communicate with a first network node, the wireless device comprising:

processing circuitry configured to:

receive at least one first synchronization signal block, SSB, from the first network node according to a first SSB provision scheme;

determine that the first network node has transitioned from the first SSB provision scheme to a second SSB provision scheme, the transition being based on signaling associated with at least one wireless device in the cell, the second SSB provision scheme being different from the first SSB provision scheme;

receive at least one second SSB based on the second SSB provision scheme; and the signaling associated with the at least one wireless device in the cell includes at least one of:

at least one polling response associated with one or more wireless devices in the cell being in an inactive state or an idle state; or a first request for a SSB provision scheme transition from the at least one wireless device in the cell.

9. The wireless device of claim 8, wherein the processing circuitry is further configured to:

start a prohibit timer at a first time upon causing transmission of the first request for the SSB provision scheme transition, the prohibit timer being configured to prohibit additional transition requests while the prohibit timer is running; and cause transmission at a second time of a second request for a SSB provision scheme transition based on the prohibit timer being expired at the second time.

10. The wireless device of claim 8, wherein the processing circuitry is further configured to:

receive a polling request from at least one of the first network node and a neighboring network node; and cause transmission of at least one of the at least one polling response based on the received polling request.

11. The wireless device of claim 10, wherein:

the wireless device is associated with a group of wireless devices in the cell; and the polling request being associated with the group of wireless devices.

12. A method implemented in a wireless device in a cell configured to communicate with a first network node, the method comprising:

receiving at least one first synchronization signal block, SSB, from the first network node according to a first SSB provision scheme;

determining that the first network node has transitioned from the first SSB provision scheme to a second SSB provision scheme, the transition being based on signaling associated with at least one wireless device in the cell, the second SSB provision scheme being different from the first SSB provision scheme;

receiving at least one second SSB based on the second SSB provision scheme; and the signaling associated with the at least one wireless device in the cell includes at least one of:

at least one polling response associated with one or more wireless devices in the cell being in an inactive state or an idle state; or a first request for a SSB provision scheme transition from the at least one wireless device in the cell.

13. The method of claim 12, the method further comprising:

receiving a polling request from at least one of the first network node and a neighboring network node; and causing transmission of at least one of the at least one polling response based on the received polling request.

* * * * *